(12) United States Patent
Christofferson

(10) Patent No.: US 11,363,282 B1
(45) Date of Patent: Jun. 14, 2022

(54) SYSTEM AND METHOD FOR LOW LATENCY DISTRIBUTED IMAGE COMPRESSION AND COMPOSITION

(71) Applicant: Frank Christian Christofferson, Westminster, CO (US)

(72) Inventor: Frank Christian Christofferson, Westminster, CO (US)

(73) Assignee: Quantum Radius Corporation, Denver, CO (US)

( * ) Notice: Subject to any disclaimer, the term of this patent is extended or adjusted under 35 U.S.C. 154(b) by 0 days.

(21) Appl. No.: 15/698,637

(22) Filed: Sep. 7, 2017

Related U.S. Application Data

(60) Provisional application No. 62/384,679, filed on Sep. 7, 2016.

(51) Int. Cl.
| | |
|---|---|
| G06F 15/16 | (2006.01) |
| H04N 21/60 | (2011.01) |
| G06N 20/00 | (2019.01) |
| H04L 29/08 | (2006.01) |
| H04N 19/426 | (2014.01) |

(Continued)

(52) U.S. Cl.
CPC ......... *H04N 19/426* (2014.11); *H04N 19/156* (2014.11); *H04N 19/436* (2014.11)

(58) Field of Classification Search
CPC ...... H04N 19/61; H04N 19/115; H04N 19/60; H04N 21/23439; H04N 21/2662; H04N 19/132; H04N 19/154; H04N 19/182; H04N 21/21805; H04N 21/23418; H04N 21/237; H04N 21/4223; H04N 21/60; H04N 21/816; H04N 5/335; H04N 19/426; H04N 19/156; H04N 19/436; G08B 13/19656; G08B 13/19667; G08B 13/1968; H04L 1/0014; H04L 1/0017; H04L 1/0026; H04L 51/38; H04L 67/2828; H04L 67/10; H04L 69/04; G06N 20/00

See application file for complete search history.

(56) References Cited

U.S. PATENT DOCUMENTS

| | | | | |
|---|---|---|---|---|
| 5,304,790 A | * | 4/1994 | Arnold ................... | H04N 5/335 250/208.1 |
| 5,828,848 A | * | 10/1998 | MacCormack .. | G08B 13/19604 709/247 |

(Continued)

OTHER PUBLICATIONS

S. Chien, K. Lok and Y. Lu, "Low-Decoding-Latency Buffer Compression for Graphics Processing Units," in IEEE Transactions on Multimedia, vol. 14, No. 2, pp. 250-263, Apr. 2012 (Year: 2012).*

*Primary Examiner* — Michael J Vanchy, Jr.
(74) *Attorney, Agent, or Firm* — Clyde R Christofferson, Esq.

(57) ABSTRACT

A method and system for minimizing image compression processing, transmission latency and bandwidth use by efficiently coordinating one or more distributed producers or consumers of images, sub images, macro images and their corresponding relevant data. By generalizing and coordinating distributed device compression, many disparate elements of the formerly unidirectional image compression pipeline may share additional information that allows each and every element to seek and implement improved compression and compositional optimization.

40 Claims, 5 Drawing Sheets

(51) Int. Cl.
*H04N 19/156* (2014.01)
*H04N 19/436* (2014.01)

(56) References Cited

U.S. PATENT DOCUMENTS

| | | | |
|---|---|---|---|
| 2006/0088094 A1* | 4/2006 | Cieplinski | H04N 21/23406 375/240.01 |
| 2006/0117268 A1* | 6/2006 | Talley | G06F 17/212 715/769 |
| 2011/0082946 A1* | 4/2011 | Gopalakrishnan | H04L 65/4084 709/231 |
| 2012/0014455 A1* | 1/2012 | Joshi | H04N 19/176 375/240.18 |
| 2013/0108183 A1* | 5/2013 | Bruls | H04N 19/593 382/233 |
| 2015/0077575 A1* | 3/2015 | Krig | H04N 13/239 348/207.11 |

* cited by examiner

SYSTEM AND METHOD FOR LOW LATENCY DISTRIBUTED IMAGE COMPRESSION AND COMPOSITION

This application claims the benefit of U.S. Provisional Application 62/384,679 filed on Sep. 7, 2016, the entire contents of which is hereby incorporated by reference as if set forth in full text, including figures.

BACKGROUND OF THE INVENTION

Field of the Invention

The present invention relates to the field of digital image compression.

Background Description

Data compression seeks to temporarily or permanently reduce the amount of data needed to transmit or store data. If data transmission bandwidth and data storage were infinite, free and incurred no delays, the field of compression would be unnecessary. There are situations where data is small, latency is tolerated, and bandwidth is sufficient. There are others where the upper bounds of requirements are far beyond current or likely mass market technology. Hence compression is essential for many applications, and will likely continue to be needed for the foreseeable future.

Although data compression seeks to mitigate transmission bandwidth, latency and in some applications data storage, there are tradeoffs. The process of analyzing, compressing, transmitting, potentially storing and decompressing information introduces computational and ultimately financial and power costs, unwanted additional latency, and in many cases artifacts in data.

Image compression and video compression (for sequences of images) is a subset of data compression technology. It is generally geared towards but not limited to human-visual range images, but includes similar consideration for multispectral sensor data or related information such as image depth data, for instance. In general, these are all represented by larger multi-bit arrays of relatively coherent data, in contrast to general non-image data which may be smaller, less structured, more uncorrelated or more sparse in nature.

The significance of image compression is easily understood in that currently over half of all Internet data traffic is associated with imagery. Hence the reduction of data for transmission and storage specifically optimized for image data can provide significant cost savings and even fundamentally enables some applications not otherwise possible.

The traditional chain describing image compression involves the creation of a source image, compression of that image, transmission of that image, decompression and finally display of the image. This simplified chain omits some elements for specific applications but captures the primary stages, and points to a process that is almost completely sequential.

There are many different image and video compression technologies. Many have evolved for different applications, with tradeoffs and optimizations for different situations. Some employ multiple techniques which can be used selectively or in concert depending on the application, the characteristics of the imagery and the capabilities of the devices involved. Many techniques are generally useful, and others are specific to certain situations, such as video compression that makes use of the similarity of adjacent frames in a video sequence.

Defense, medical, consumer and various commercial applications may have different cost/benefit structures, resulting in some scenarios where different solutions are justified and employed, such as for example custom expensive hardware-level implementations that speed computations or improve quality.

In certain applications the sheer continuous volume of generated information is a limiting factor for these choices, potentially requiring tradeoffs on compression performance and storage or transmission. An example is the real-time consumption and archival of Internet streamed video from billions of users, such as on Facebook or via Youtube. Despite parallelization and scaling, continuous, ever increasing amounts of data present challenges that limit the amount of time that can be spent processing incoming data, regardless of cost structures.

Although images destined for human visual consumption are currently dominant in commercial and consumer applications, this can drive a narrow view of even multispectral imagery and the needs of compression. For example, image compression associated with networked machine assisted or machine-automated image analysis or deep learning associated with imagery can be employed without direct human visual consideration and within diverse applications such as scene recognition, vehicle sensors or automated visual database construction. These non-visual uses and operations upon imagery are likely to increase substantially in the future and require a more flexible approach to image compression.

Decompression is the tandem process by which compressed data is restored. It generally must be coordinated in some manner with the corresponding compression technique in order to correctly reverse the process employed. The combined process is often simply referred to as a "codec" (representing "compression/decompression").

Some compression techniques are lossless, meaning they allow compression and corresponding decompression without loss of any information. Many are lossy, which may increase compression ratios at the expense of reconstruction accuracy. This is one area where image compression generally strays from most other data compression, since tradeoffs are often deemed appropriate given the human consumption of most (but not all) images, where certain errors are tolerated or literally smoothed over by the complex and capable human visual system.

Compression and decompression are often asymmetric, generally meaning more effort is placed on the compression process than decompression. A counterintuitive example is streaming video received by large numbers of end users, where the potential aggregate decompression cost is effectively very large. Still, compression is generally much more resource intensive than decompression. Often this is possible because a relatively large amount of resources and time can be justifiably allocated to obtaining the benefits of compression, particularly in non real-time encoding. For example, it is common for streaming movie services to spend significant offline effort encoding imagery, attempting to retain as much image quality as possible and simultaneously encode multiple degradable images that can account for variability in delivered bit rate over a network.

The majority of images and videos are compressed using standards such as JPEG, MPEG or H.264. Standardization, in theory, enables a minimal and optimized set of software and/or hardware on both ends of the compression pipeline.

It takes enormous effort and time to develop and agree upon these standards. Most standard codecs have implementations with complex internal tables and bit settings used to assure the decompressor can assemble sequences of images and understands what to do with the compressed bits that are received, using appropriate corresponding algorithms. Because most standards include many options for different scenarios and situations, the goal of squeezing out bits is often understandably compromised to ensure compatibility and generality.

The vast majority of techniques and standards for encoding video have started with the base of a rectangular image, which conforms to source imagery from cameras, web video, and original film, which have up until now been rectangular (although varying in ratio as well as spatial and color resolution). In general, modern image compression techniques have thus focused on taking rectangular arrays of digital data and finding a more efficient representation that takes into account that shape.

This has given rise to an emphasis on techniques and implementations that work on regular rectangular blocks of regular data, such as 8×8 or 16×16 pixel groups. The most common example is the DCT (Discrete Cosine Transformation), which uses a reduced mathematical representation of cosine functions to approximate a block of data with coefficients representing various frequencies discerned in the data. This mathematical algorithm and machine implementation have been highly optimized for this purpose. Standard codecs can provide extensive flexibility and detail in applying and interpreting this type of algorithm, as well as making extensive use of precomputed tables of values to speed execution.

Other mathematical compression techniques seek to approximate data in different ways but with similar general concepts, such as applying fractals, wavelets or Fourier transforms to find reduced representations of the data or seeking other similarities of signal (data) patterns that can be represented with series of equations or waveforms. Different techniques may be optimal for different situations and depend on both the data and the optimization or measure that is the goal or use of the compression.

Another significant component of data compression technology in general and image compression, in particular, is quantization. Generally, it is treated as a separate stage in the compression/decompression pipeline, employed together with algorithmic analysis and minimization of data representation. Briefly, the concept is to attempt to only employ minimal and efficient representations that are needed for data values, or to in some way minimize the set of data. The alphabet is a type of quantization, where for example 26 values can be combined to encode written English words, in contrast to the Oxford English Dictionary of over 170,000 words. Chroma or luminance quantization is a common technique used with images, focusing on characteristics of human visual perception. Even more straightforward quantization is also possible, where a practical example for images would be a situation where 24 bits of data is used per picture element (pixel) in an image but in total has only 65,535 unique values. An indexed quantization can thus be created that is lossless and still represent 24 bits of information but compresses the representation to 16 bits per pixel (roughly a 33% reduction). The analysis and indexing associated with quantization do not have to be linear or regular, and hence can itself be optimized in various ways. It can also be forced (where data is deliberately trimmed and grouped in some fashion such as the chroma/luminance example cited), which is common.

Another way to categorize video content and its corresponding compression are real-time and nonreal-time. All data compression involves some intermediate computation and buffering, but some applications allow the introduction of more significant computational latency and buffering. In these cases, it provides some flexibility to account for requirements such as high-quality metrics, or variable transmission bandwidth and may employ additional compression techniques (for example, multi-frame correlation analysis). Generally, real-time video, in contrast, includes content or applications that have much more stringent requirements for delay and must limit computation and buffering. Video conferencing is a traditional networked example for this, limited by the fact effective interactive human communication requires the exchange of images (and concomitant audio) within low hundreds of milliseconds. This means the techniques employed for compression must be low-latency and matched very carefully with available transmission bandwidth and codec computational resources.

Other real-time applications using video compression can have more severe requirements. An application with lower latency requirements than video conferencing is interactive network gaming, where latency above tens of milliseconds and high variable latency are generally unacceptable. An even more stringent real-time application is networked Virtual or Augmented Reality (VR/AR) or similarly remote visual-based haptic response systems, with a budget of around 10 milliseconds encompassing the entire time loop of user positional or action input to human image visual reception (this is often referred to as "motion to photon" time in VR). In addition to extremely low latency requirements, an added complication can be almost no tolerance allowed in variability between image updates for many of these applications, where image updates must be on a regular cadence of, for example, 120 Hz.

Real-time image-based decision making for autonomous purposes is probably the most severe of all applications in terms of required latency, with zero latency as the only ultimate risk reduction in certain situations, such as vehicular device guidance based on imagery (for example automobiles autonomous reaction via networks or aerial vehicle semi autonomous remote operation).

An important prior art use of digital imagery is compositing, which broadly includes combining, blending, editing, and comparing images. Used here, it is generally distinct from image generation (the source of a base image), or image analysis (which concerns itself more with the content of images, such as algorithmic object recognition or edge detection). Early real-time image combinatorics were purely optical, such as in many early flight simulation displays where the projection of different imagery was combined through multiple projectors, some of which could be mounted on dynamic gimbals. Some remote operation systems used similar systems in reverse, combining imagery from a remote location. Once digital techniques and networking evolved for these real-time applications and new applications appeared such as video conferencing, image compositing began using digital buffers on either end (source or destination) of an application.

Realistic discussion of low latency image systems using compression must also consider the history and design of digital frame buffers (variously also called image and video buffers and other names). First developed as a digital memory to scan out raster images in CRTs (Cathode Ray Tubes), they have expanded and improved as memory technology and architectures have advanced, and have been adapted for new displays such as LCD (Liquid Crystal Diode) based displays. Image buffers started as fast memory linked to the display, which created enormously more flexibility compared to prior analog display systems, allowing digital modifications to source images, and the introduction of such features as use of flexible color palette look-up tables to improve image quality. These systems initially scanned out lines of memory which correlated to the CRT raster deflection timing, bridging analog and digital worlds.

As displays became effectively completely digital and memory became faster and cheaper, flexibility increased. Eventually, the vast majority of displays used this digital design, whether for television or computer monitors. Standards evolved such as HDMI and DisplayPort which describe the interface and timing necessary to reliably send a signal to these common display buffers. There are usually many different display configurations (resolution, color palette, color temperature, and many options), with the task of endpoint display buffers to very quickly send an image to the display, and update that rapidly. With advancement in GPU (Graphics Processing Units, used in image creation) technology as well as digital endpoint display technology, the most common architecture evolved bifurcating the display buffer into two separate buffer components: one-half dedicated to direct access by the GPU or source side of imaging; the other optimized for fast display of pixel data.

SUMMARY OF THE INVENTION

The present invention is an improved method and system for approaching and implementing video compression, reducing latency and improving multisource image coordination for real-time environments. It is a general technique that can be used in concert with other image systems and compression methods.

The concept is to employ flexible coordinated buffers with encapsulated data as a primary tool in compression systems that not only help define an image for use by multiple simultaneous endpoints but can be used to help improve the efficient creation and final use of the images. As with all image compression, the invention is overarchingly concerned with reducing the amount of data needed to represent the transmission of an image, but part of the innovation is that this can best be achieved by not simply considering the image, but improving its creation and use, especially in a distributed environment. A key idea is to orchestrate compression from a system perspective and solve it in a holistic manner.

The moment of clarity regarding the invention was recognition that products and systems employing image compression always solve very specific performance optimization, from a narrow viewpoint. Components such as image rendering systems or display systems have taken very parochial views of the problem, and share just enough information for a particular application or hardware implementation to be optimized. Truly robust sharing and combining of images from multiple sources and multiple endpoints were relegated to nonreal-time scenarios, relying mostly on software architectures and implementations to attain flexibility at the expense of low latency or high efficiency. The potential power of these distributed systems combined with the speed of the tightly integrated image generation, compression and display systems was not being bridged and their coordinated use might never converge. The present invention overcomes this misdirection of inventive resources.

The invention has its roots in part from inspiration of general problems associated with networked rendering (such as the author's prior contributions to US patent U.S. Pat. No. 6,115,038A, "Method for creating lower cost real-time 3D graphics in a distributed environment") and challenges associated with networked coordination in distributed teleconferencing (such as the author's contributions to prior U.S. Pat. No. 7,006,616B1 "Teleconferencing bridge with Edge-Point mixing" and U.S. Pat. No. 6,807,563B1, "Automatic teleconferencing control system", one of the author's brother's patents on inter-process/device communication, as well as another of the author's brother's contributions on data and task pipelines, as well as the author's father's contributions to patents improving coordination of air traffic and even multiple patents of the author's great-grandfather over a century ago improving coordination for railroad system signaling. The problems and opportunities presented by these distributed systems and their coordination and optimization are very similar in fundamental nature. The challenge here is to do it better for imagery.

Key to understanding the benefits of the invention is the observation compression should not be a single function in a unidirectional pipeline for a single image (compression, transmission, decompression, display). The image pipeline needs to be a two-way and even multi-directional path by design. Although the traditional concept of image compression is a linear pipeline from source image or renderer to the display device, the advent of intelligent and sensor-driven devices at the endpoint and applications like shared virtual spaces change the requirements. Images or portions of images can be sent (and hence compressed) generally in either direction, or both simultaneously, or to many destinations. Thus, evolving compression should be a part of the shared knowledge base for an expanded universe of system elements in a product or service that each care about optimizing compression in addition to their primary task. By sharing this knowledge and coordinating compression, the entire system can be made more efficient, powerful and ultimately reduce transmission latency and bandwidth.

The concept and hardware implementation of physical (not virtual) digital frame buffers can optionally be improved by use of the invention. Currently, sequential rendering systems create an image, send it to an image buffer on the rendering device (usually implemented with multiple buffers for efficiency and image or "frame" timing reasons of image creation), then convert that to a digital display standard such as HDMI for output to a cable which is received by the endpoint display buffer and converted to drive the display.

Using the invention, the compression function would be built throughout this frame buffer processing. For instance, the rendering buffer may no longer need to be uniform and assume a separate compression stage, being written to directly in compressed format at variable pixel or data depths. This means components such as pixel engines could use optimizations with different bit depths during rendering for different pixels, or different depth buffer bits, for example, and place those in that format in frame buffer memory. Current terminology may be limiting or confusing here, in that the concept of a bit or bit mask or variable bits is not intended to connote strictly binary data. A pixel can have arbitrary data depth, perhaps reprsented by a single bit, perhaps 2 bits or 3 or 9 or any number of bits, and also have additional "depth" that is not spatial, but a data structure. The purpose of precisely limiting each pixel (or hyperpixel) is to offer reduced representation, breaking the prior art mold of using a single (albeit in some cases reduced) bit depth for an entire image. This would compress the size of the transferred image, a primary goal of the invention.

A key portion of the invention application is that concurrently, the design of the receiving frame buffer at the display would use the invention to be aware of the same configuration of this memory, and could locally expand and index fully, efficiently and coordinated via the buffer and its attributes with the renderer. This could be accomplished for example by modifying standards such as HDMI to allow configurations that signal and interpret in this fashion. Among other things, this means intrinsically treating any imagery source and any final pre-compressed display buffer as a part of the same system, and not simply sources or output destinations.

It is also a possible but not limiting configuration where even all local devices (those using one or more local buses such as PCIe, as opposed to a network connection) employ the same compression storage and transmission methodology. This would also serve the purpose of reducing transmission on these busses. It is a design decision as to whether this has performance or cost benefits overall to the local system.

It is also possible but not limiting the invention to optimize the placement of compression memory with regards to network transmission. Controllers for network packetization and transmission of the compression memory, multiple ports, and so on can be optimized within the system. For instance, it may be appropriate to have a dedicated high-speed wireless transmitter embedded within the compression memory, which serves the sole purpose of outputting to listening display devices.

An example where improved communication amongst element is immediately obvious is optimization of these color palette tables (color or chroma/luminance values) used in image buffers, which is common in compression techniques. With the invention, this can be further improved. An application may employ known scene lighting or texture map usage that should be used by the compression system, as a temporary but optimal palette. Similarly, depth rendering and compositing may change throughout execution for all or parts of an image and could be used for optimal compression. Also, the ambient lighting environment of a user may change and be detected, suggesting the need for the propagation of the most effective palette backward throughout the system. Similarly, the introduction of a colorblind viewer may change the palette or use of the system, as would dead pixels in the display device. Yet another example would be a remotely operated vehicle which may temporarily require only a limited image palette in a snowy environment or in a thermal detection spectrum. These are a few examples of optimizations that are possible with the invention.

It is critical to understand this concept includes extensions that are distributed or virtual. The coordination of multiple elements producing or consuming portions of the image or images may be optimized to assume point-to-point communication between only certain elements, or multicast data between any or all elements. Many combinations can be imagined, with multiple sources and multiple destinations and uses of all the various sub-components based on their needs or capabilities. Although focused on compression, this integrated approach thus allows but does not require a single unified point where all this information comes together, nor a singular use of that image data. The concept is general and may be implemented in a local or more virtual and distributed fashion. It can be seen to those skilled in the art that all elements would rely upon the invention, coordinating the creation and assembly or the composition of images with optimal transmission compression being the overarching goal.

It is also important to understand the regions and data need not be exclusively spatial, despite the primary nature of most images emphasizing this aspect. For instance, it would be likely that a sensor source for gesture recognition (to be processed primarily locally or alternately in the cloud) would create a limited-depth buffer and information (such as hand/finger splines or even locally rendered images) and send this upstream for shared use. Other elements of the system may need to be aware of information derived from this local image data or rendering, but may not necessarily require it in image form or at the same resolution (spatial, color or depth). Yet such information could influence and improve the overall system image creation and compression. Similarly, flexible image data such as single or multispectral (e.g., infrared or other non-human visual representations) along with depth buffers and similar pixel/sensor information can be considered.

The reason the problem addressed by the present invention has been ignored is primarily twofold. Firstly, as mentioned image compression has been treated historically as a self-contained, sequential pipeline. Images are consumed, compressed, transmitted and reconstructed. That optimization has been passionately pursued with that sequential assumption. Secondly, research and industry emphasis has focused on implementing the image rendering and display pipeline. It has been a busy space for innovation. Examples of newer techniques only now reaching general understanding and common implementation are foveal rendering (area of interest focused rendering, usually based on eye tracking) time warp rendering (using the last frame as part of a new image) as well as rendering techniques that extend prior ray tracing to create light field volumetric image spaces. Corresponding newer display techniques such as waveguide optics and other high-resolution display technology have been the focus of implementation. With this energy and focus, marrying a broader approach to compression that isn't just an efficient black box and considers the needs of distributed image creation and consumption has not been considered.

The invention builds upon prior compression systems and techniques but emphasizes new distributed applications have compositing and low-latency requirements and potential benefits that require additional context for optimal compression decisions and coordination among the components involved in the complete distributed image generation, transmission and consumption system.

It is, therefore, the object of the present invention to reduce overall latency and bandwidth used in the transmission of real-time images.

Another object of the invention is to improve the efficiency of multiple components, devices and network elements working in concert to coordinate and cooperate in the creation and transmission of real-time imagery, allowing spatial, temporal and arbitrary subdivision of the tasks for creating, compositing, compressing and transmitting imagery.

It is further the object of the invention to enable and enhance low-latency real-time shared imagery, improving the compression performance and customization flexibility for multiple sources and or multiple destinations of imagery used concurrently.

The invention provides an architecture for lowering latency and improving coordination of multiple network and device elements creating real-time imagery.

In summary of the motivation of the invention, it is clear evolving content and low-latency applications will place increased demand on network bandwidth and require more flexibility. This will require the further corresponding evolution of video compression techniques. In particular, for the mass market, higher resolution images used by lower latency (and higher frequency) real-time applications and the increased use of distributed resources to generate images compel new approaches. Even significant improvement in radio frequency wireless network performance or evolution to future networks such as quantum state communications will require minimization of data representation to reduce cost at the least. Increased amounts of data from endpoints such as sensors and image generation such as renderers necessitate improvements to the prior art in order to help propel overall solutions forward.

Related Implementations

One current solution to providing compressed imagery over a network or device link is to implement within applications or image pipelines high-performance image codec standards such as H265. These solutions focus on improved block-based optimization within a monolithic image or sequence or images and are deficient because they do not currently provide for general coordination of external data that may improve combined rendering, compression and display performance in concert, nor coordinate distributed image compression, nor provide for optimization of multi-source and multi-destination imagery in general, nor optimize for low-latency environments.

One current solution to deliver large quantities of compressed imagery over a network is to stream video with services such as Netflix or YouTube, which use buffered compression. Extension of this technology to newer 360/180 stitched video streaming and variants that include volumetric projection streaming are similar to each other in that they employ extensive, high-latency preprocessing of imagery. These systems are deficient for the same reasons as standard codecs listed above.

One current solution to presenting low-latency imagery such as VR is to avoid the need for compression by generating the image locally on a portable device attached to the display system. This is deficient because it limits the capabilities of the rendering system by relying on limited power via battery or fuel cell. An example would be the self-contained Intel Project Alloy reference design, Microsoft Hololens, an iPhone employing the Apple ARKit, or an Android-based phone currently based on Daydream. All these solutions place severe limits on the rendering capability of the imagery system when compared to non-battery powered competitive systems. This also increases the bulk, weight, and heat generated by the portable device, which is deficient.

Another current solution to presenting low-latency imagery is to create imagery on a nearby local device such as a Personal Computer (PC) and attach the graphics output of this device via a cable (such as a standard HDMI or DisplayPort cable) to the display device. This is deficient because it entails a cumbersome cable (often referred to as a "tether") to deliver the imagery, and limits optimizations to the single source of images and a single display device.

Another current solution is to place the local device in a backpack or hip-pack, which has similar fundamental deficiencies as listed above on a small portable device, but increases rendering capability at the expense of increased weight, bulk, and heat. A current example is Hewlett Packard's Omen backpack VR product.

Another class of solutions involves attempts to avoid or limit the need for compression by applying very high-speed wireless connectivity from the nearby rendering device to the display device. Wireless networks are important for most practical low-latency solutions but are deficient by themselves in current implementations because they focus on creating a local high-speed endpoint connection and do not facilitate any coordinated capabilities other than rapid data transmission, limiting opportunities for global compression optimization and other features of the invention. In some cases, these solutions implement special-case compression optimizations to reduce image data, but these are not general-purpose nor effective for coordination beyond a single image source and single image destination. An example of a current product is TPLINK's TPCAST addition for the HTC Vive VR product, or wireless implementations of display cable standards such as HDMI.

Another current solution to producing lower latency compression is to employ viewpoint-assisted compression such as foveal or region-based compression, as in U.S. Pat. No. 5,103,306A, "Digital image compression employing a resolution gradient", or U.S. Pat. No. 7,965,314B1, "Foveal camera systems and methods". These methods are variants of standard compression (substituting, for instance, region or polar radial compression for block based compression), and are deficient for the same reasons as standard codecs listed above, with the exception they provide limited additional guidance of compression such as ergonomic-inspired region-based foveal compression.

Another current solution is digital video conferencing systems which blend multi-resolution source video imagery but are deficient for the same reasons as codecs listed above, with the exception they provide limited guidance of compression from an external source (providing a limited viewport within a panoramic source image, for instance), or limited compositing (by blending standard compression streams).

Another current solution employs parallelization of hardware and software components in a real-time configuration in a shared memory or high-speed local network manner. Examples are parallel graphics processing units (GPUs) and groups of these units, such as NVIDIA or AMD graphics components, and their coordination via mechanisms such as SLI (Scalable Link Interface) or libraries employing them created by VR companies such as Oculus. These solutions are deficient because they focus on rendering imagery in monolithic environments of similar devices and do not currently coordinate outside of these environments, nor facilitate general network image compression and compositing due to their understandable singular focus on accelerating a unidirectional image creation and display pipeline.

Another solution to the compositing portion of the invention is current compositing or image creation tool systems. These are deficient because they are designed for compositing, but not low-latency compositing, compression, and transmission. These applications or toolchains are designed for flexible artistic combinatorics with multiple images and video from multiple sources, converting and blending images from different standard formats. Products such as Adobe Photoshop or AVS enable manual and automated image combinatorics in this fashion.

A solution for sending a single compressed source video to multiple destinations is multicast video streaming employed by services such as Twitch. These systems are deficient for the same reasons as standard codecs listed above.

Those reasonably skilled in the art can envision implementing the invention in concert with many of the aforementioned deficient products, improving their performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
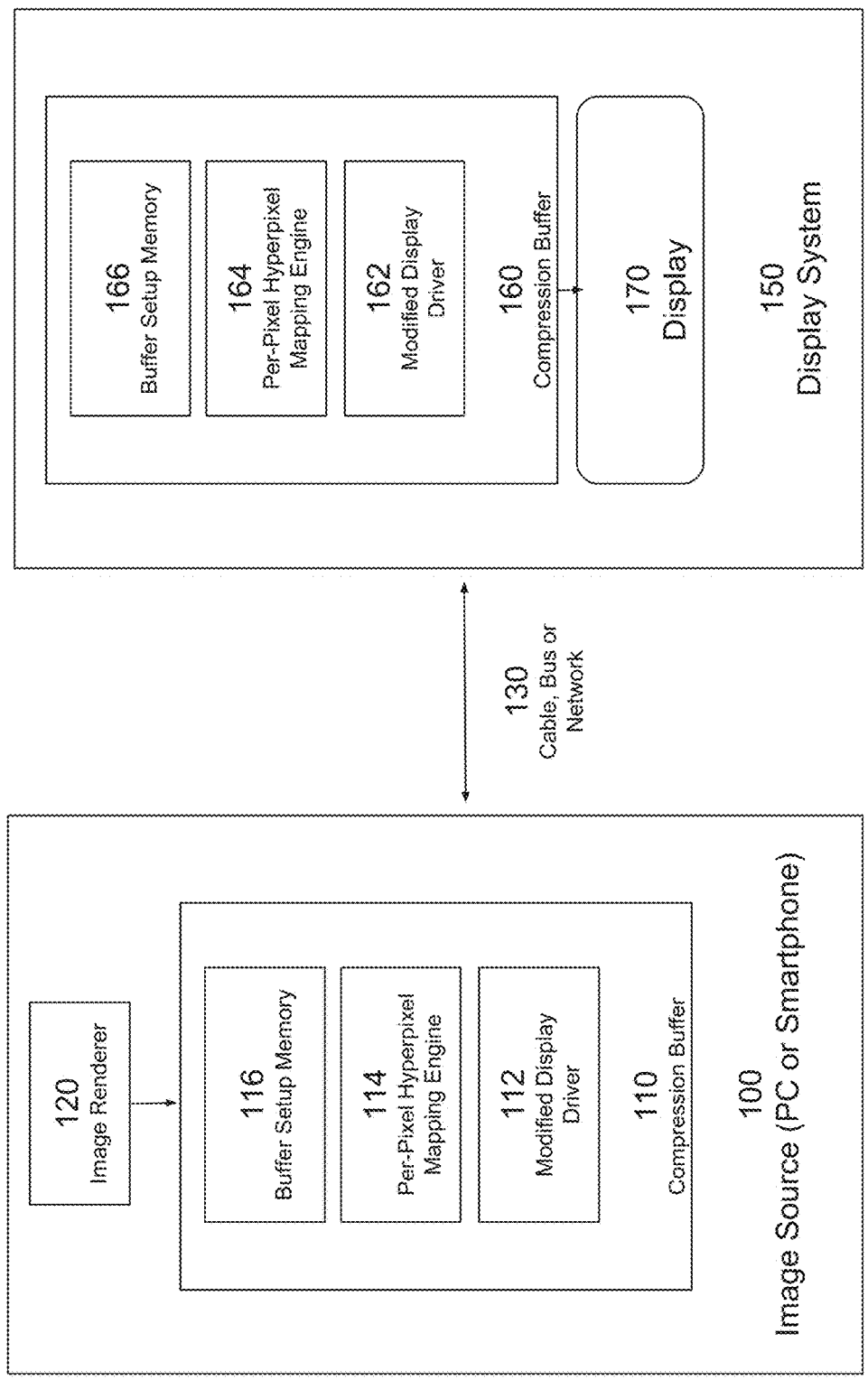
FIG. 1 shows a block diagram of a minimalist display system, with primary sub-components, in accordance with an embodiment of the present invention.

The following descriptions are of the best presently contemplated modes of carrying out the invention. All the preferred embodiments are implemented with a flexible virtual pixel-like buffer hereafter sometimes referred to as a "Virtual Compression Hyperpixel Buffer (VCHB)" for the sake of convenience.

The reference acronym "VCHB" includes "Virtual" to denote the shared buffer or buffers may or may not exist physically on a single device memory, and may or may not be used for single image representation. The Virtual buffers may be replicated and synchronized in some fashion. They may have distinct buffers for different related or unrelated images and uses, and they may include combinations thereof. They can be used for compositing multiple images.

The application of the word "Hyperpixel" indicates the buffer considers not just data corresponding to physical pixels (with spatial and color ultimately used in frequent common but not limiting usage), but can also represent higher or lower resolutions (such as those used for effective composite blending or anti-aliasing techniques, for example, or reduced resolution expressions of the image), and include metadata associated with imagery which explicitly improves distributed compression coordination, such as placement of inserted images relative to a primary image, or focus point in foveal images. It can also refer to other dimensions of data such as temporal relationships between related pixels in related images, for example.

The word "Compression" is used to indicate the primary purpose of these buffers is not general-purpose data state sharing, but to improve compression, in all its uses and forms related to a distributed system (including but not limited to intermediate storage of the coordinated buffers or their compressed versions or simply transmission states of the buffers, for example). An implementation could include more general data sharing beyond that which assists compression and compositing purposes.

The preferred embodiments include the flexibility to assign and represent component VCHB values in multiple forms. The buffers can represent uniform or irregular data and can represent any data structure, including but not limited to non-rectangular multi-directional arrays, single data points and vectors in any combination. The information can be represented at multiple resolutions and with multiple dimensions.

The VCHB is intentionally differentiated from traditional display buffers particularly in the area of flexible or variable bits assigned to correspond to a pixel or hyperpixel, which is a major source of compression optimization for the invention. As always with hardware systems, implementation details such as memory structure, register boundaries, and error correction must be considered, but these are not foreseen as significant limitations on the embodiments and the invention's benefits.

All the preferred embodiments have in common the assumption that use of the VCHB entails a setup phase and a dynamic phase. The setup phase would include as much pre-calculation, pre-communication, and pre-setup (preset) and initialization of such data as color lookup tables as possible. The intent is to consistently minimize effort and transmission of sequences of image data, but at the same time, the embodiments allow flexibility to adjust or change preset data dynamically. Any preset data can be changed dynamically, but optimal compression is obtained when most preset is performed prior to dynamic image compression. These features are not foreseen as significant limitations on the embodiments and their benefits.

The preferred embodiments assume image and video data and their metadata are not limited to human-visual range imagery, and it should be reemphasized the broad definition of imagery in practice and prior art includes similar consideration for multispectral sensor data, artificially generated images, related information such as image depth data, as non-limiting examples. The image data and metadata contained in the VCHB may thus include non-visual but image-context information, user information associated with imagery or its applications, device characteristics, or other information which aids one or more devices or network elements contributing to or consuming the image and its efficient compression and transmission.

Although it does not seek to replace general application communication in a networked environment, the embodiments' implementations explicitly recognize image compression has prior served as a type of negative firewall across networks and seeks to eliminate that barrier.

Many other applications may benefit from the invention. These embodiments' descriptions are made for the purpose of illustrating the general principles of the invention. The detailed description below of the figures are not intended to limit the example components or uses of various components. This can be readily understood by those skilled in the art of implementation for such components and systems.

The first preferred embodiment is represented by FIG. 1, which corresponds to a basic display system analogous to early frame buffers and is still common in commercial products, with little modification. In this embodiment, a limited number of features of the invention are employed with the eye towards evolving compatibility with current direct display implementations. For example, a common standard device is a high-speed cable such as HDMI 2.1 employing VESA-like minimal loss compression for high speeds and resolutions, attaining an estimated 3:1 compression ratio by using very basic compression techniques reducing an HDR palette to 8 bits (thus 24:8 compression). This would be a target for extension, applying the preferred embodiment.

The invention allows further opportunities for compression by extending the standard implementation. Instead of aiming for monolithic 8-bit compression (the source of basic compression) as in current practice, the invention would allow per-pixel variable bit basic compression, taking advantage of multiple lookup tables and multiple depth resolutions, pre-coordinated using the invention. Thus large portions of the image could employ 2 bit (4 color index) depth, likely representing many near-black or near-white regions typical in an image (or other similar common high-ranges, low variability within a color, for example, blue or red). It is expected that in common lower-latency image situations such as conferencing this would attain at least a 2:1 additional compression, and that in applications such as foveal use it would attain much higher ratios, with much lower computational latency than robust codecs. Very abbreviated versions of block and temporal buffering (comparing pixels adjacent in time as well as spatial dimensions) could optionally be employed to improve this. Further, in applications that involve image overlays, image insertions, application guidance of palette on a frame basis or obstruction (see preferred embodiment 3), or repetition of internal imagery, even more compression would be likely over alternatives such as multi-stream transmission. Further, in situations where the imagery can be further optimized spatially by coordinating the resolution (not just the bit depth) with one or more sources of the image, such as multiple distinct renderers, vast additional compression is possible.

As with early image buffers, source images are represented in digital form and transmitted to the display via an intervening cable or network, reconstructed and sent rapidly to the display, with coordinated color buffer indexing on both sides. Various intervening bus, cable or network controllers, clock elements, or individual signal wires are not represented in detail for simplicity.

This embodiment highlights a few key benefits of the invention and demonstrates how they would improve such a device or system. It is intended to be implemented within current standards such as HDMI 2.1 (for high-speed cables), using standard low-loss, low-latency minimal codecs (micro second implementation class encoding and decoding) such as VESA DSC, operating within the HDMI standard, as an example. Selective use of much more robust codecs would be likely and favorable to compression ratios, and ultimately most likely combined with general application-level compression optimization using the techniques of the invention.

The most prominent benefits of the invention applied in this preferred embodiment are
  a) Additional compression gained from the employment of the invention's variable bit depth approach to pixel representations.
  b) Additional coordinated compression enabled by the invention's frame and scene setup coordination of palettes.
  c) Possible improvements in rendering spatial or pixel compression enabled by coordination of image requirements influenced by the display device or user, such as ambient light fluctuations.
  d) Possible hyperpixel improvements in compression by using lower intermediate spatial resolutions through dithering or anti-aliasing techniques, enabled by representations at higher than 1:1 ratios of the image buffers.

1. 100 Represent a simplified basic source system. This could be a Personal Computer (PC) system intended to attach to a display via a cable or network, or an embedded system such as a smartphone or tablet or console with an internal signaling system such as a bus. In most common use this is a system with an operating system, memory, storage, input/output systems and an embedded image rendering capability, such as a camera or graphics engine. These elements and some others are omitted for simplification. It is the deliberate intent of the embodiment to represent this as a standard system, with the exception of the substitution of the invention's VCHB compression buffer for a standard buffer, and to assume the data and setup coordination related to this. Images are generated locally in the example via the renderer, but this is specifically not a limitation with the preferred embodiment, similar to as expanded within the other preferred embodiments.
2. 110 Represents a simplified component view of the VCHB, called the "Compression Buffer" here. It shows basic logic elements including:
   a. 116 which is where images are stored in compressed format and also contains setup information, lookup tables, and image parameters to be exchanged by all devices if needed and present.
   b. 114 which is the compression engine, which may include traditional low-latency compression capabilities such as VESA DSC and HDMI compatible representations of pixels. But it specifically also applies the invention to incoming pixels from the renderer (or, if the renderer is VCHB aware and uses VCHB steering data to pre-compress, simply accepts in this format). This means the pixels can now be represented in variable bit-depth format per pixel, which is the source of additional compression for this implementation. This variable bit-depth is coordinated with the VCHB on the other side of the cable, bus or network to allow unpacking of pixels.
   c. 112 which is the modified display driver which sends compressed images to its destination
3. 120 Represents the image source, likely a renderer component. These subsystems traditionally output regular, uncompressed, full resolution, full-color images, but as noted in 114 could be coordinated and optimized with the preferred embodiment. It could also represent a camera or other source creating images.
4. 130 Represents the intervening transmission medium. This might be a cable such as an HDMI cable (with appropriate extended logic, components, and coordination on both sides), a network (with appropriate signaling and components on both sides as well as possible packetization), or a bus (with appropriate internal controllers, signaling, and registers, for example).
5. 150 represents the simplified display system. It would most likely be a standard digital display such as an LCD display (represented by 170) with included high-speed controller and driver, which is directly fed traditional data by 162, the VCHB's display driver.
6. 160 represents the receiver-side VCHB, analogous to 110, but intended for final display, although it is not limited to simply this function with the invention.
7. 166 is analogous to 116.
8. 164 is analogous to 114. It coordinates precisely with 114 (and any other instantiations of the buffer or buffers), but it's engine is primarily intended to interpret or unpack pixels in this embodiment.

9. 162 is analogous to 112 but primarily focused on feeding the display 170.

A very small example may be illustrative of compressed bit flow applying this embodiment. This example is an extreme minimization of an image, and the corresponding setup and implementation buffers.

a) A 3×3 pixel image is represented in the buffer.
b) The four corner pixels are 2 bits in depth, the remainder are 8.
c) The setup for both copies of the buffer for each frame or group of frames includes the 3×3 matrix of pixels at the appropriate depth, along with 2 color lookup tables (one 4 value, one 256).
d) A 3×3 image is created at 24 bits of depth for all pixels. The source engine (114) quantizes these values in some fashion, writing bit values for the corners, and uses 8 bits for the rest.
e) The compressed transmission includes raw bits of 2+8+2 for the first line, 8+8+8 for the second line, and 2+8+2 for the third line. As a serial raw transmission and considering use of the coordinated buffer, no bit depth information is sent per frame, and no lookup tables are transmitted per frame.
f) As a note, if every frame changes bit depth or lookup table values, there may be little benefit to employing the invention (as would be the case with certain conditions with every codec). However, in circumstances where groups of frames or similarities in groups of frames occurs, it is possible to pre-provision the setup buffer tables with enough variations to still allow considerable optimization. Hence the setup buffer is not limited to a single "mask" or description of the bit depths of the image, nor a single lookup value (nor, as described in following embodiments, just basic image data).
g) The display engine reconstructs a full 3×3×24 bit image and displays it.

Figure 2:
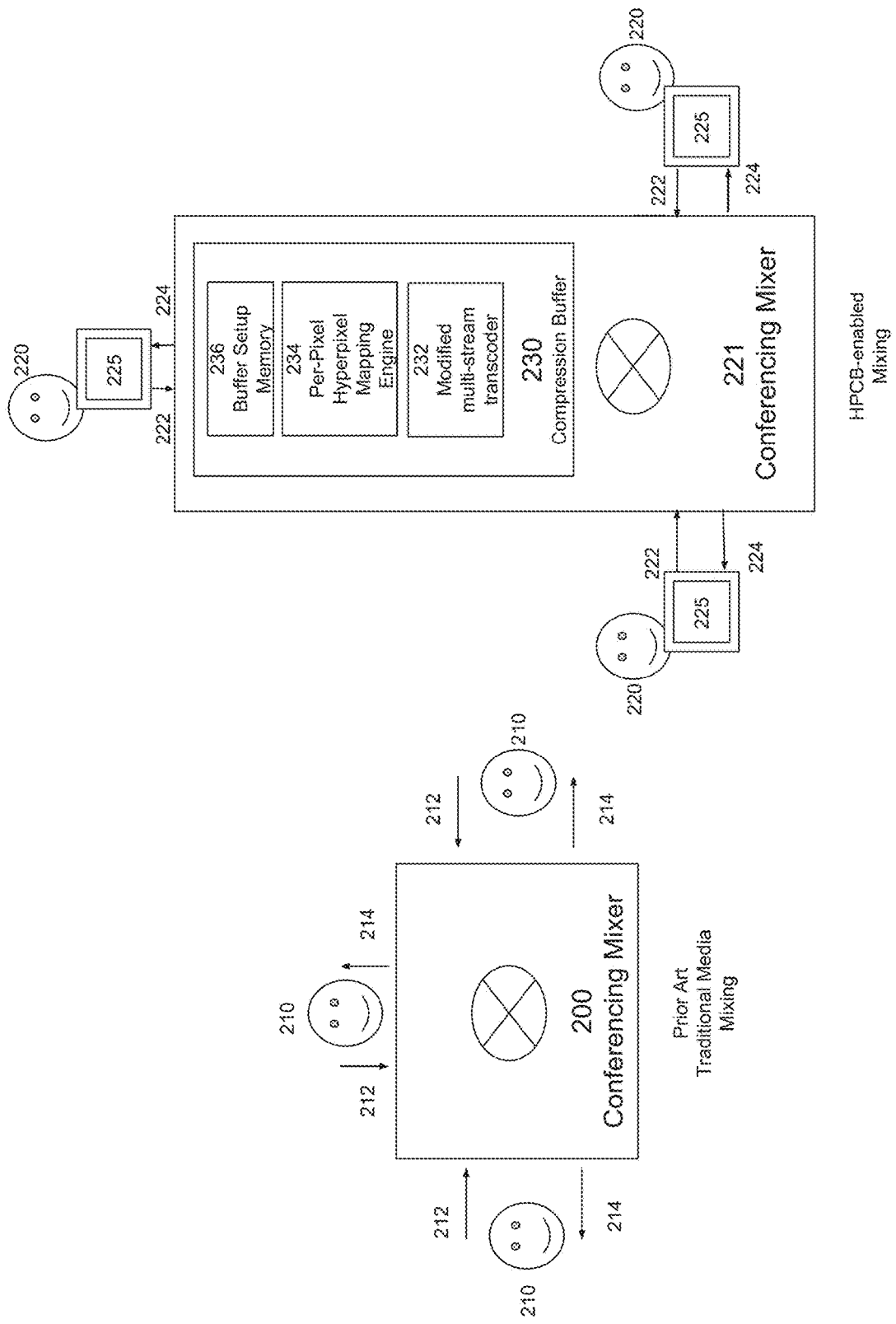
FIG. 2 shows a block diagram of a networked video conferencing system, with major sub-components, in accordance with an embodiment of the present invention.

The second preferred embodiment is represented by FIG. 2, which corresponds to a basic video conferencing system typical of current cloud-enabled mixed audio/video systems.

FIG. 2 shows prior art with conferencing mixer 200, which is a server that takes multiple sources (212) and destination (214) media (video, audio, and some control information) from multiple participants (210) and mixes them into a custom stream for each participant, allowing different use of bandwidth on each source path and each destination path. Thus, if a participant has a lower bandwidth connection the system uses lower resolution codecs for each upstream and downstream leg for that user, and uses the combinatorial function of the server to only send a single lower resolution stream back to this user (as opposed to sending instantiations of each other participant's streams).

Using the preferred embodiment of the invention, the mixing function on the server 220 would be enhanced by adding the invention's VCHB, which would allow additional flexibility and opportunities for further compression by allowing more bit depth variability (and hence compression) or alternatively or in combination with traditional codecs to optimize quality and reduction of latency of this mixing function.

221 represents the conferencing server as in 200, with 222 providing media input and 224 providing media output from the server, respectively to users 220. However, now there is a compression buffer system implemented, with a version of the buffer at the user endpoints (225) and within the server (230). This means inputs and outputs (222 and 224) are now compressed with the invention, which may be used in combination with prior compression techniques. The expansion explanation of the compression buffer is shown in the server 221, where it is shown that some setup memory or storage (236) is reserved (and would be coordinated with similar components in a version of the buffer on each endpoint), an operation or mapping or combination function operates on each pixel (234) and contributes to the output compressed bitstream. This mapper (234) is also labeled a transcoder to facilitate common current terminology in the case of conference images, where very simple image combining and compression is the core current function (now enhanced with more encoding/decoding compression capability via the VCHB).

This application of the invention not only enhances the compression streams by allowing lower latency implementations with better compression but also facilitates flexible combining of the various video streams. For instance, if all users in a 4-way conference have a full-size image of themselves and a smaller inserted image of the other 3 participants overlaid upon this, current systems would transmit the complete image from the originator. In fact, the invention's system would allow savings of bandwidth by not saving those occluded pixels throughout the system.

A considerably more complex third preferred embodiment applies the invention to a real-time, distributed virtual or augmented reality display system as a way of demonstrating all of the invention's key features.

This embodiment illustrates that many existing data and techniques which improve existing compression or rendering optimizations can be used in a much more general and efficient way employing the invention.

Figure 3:
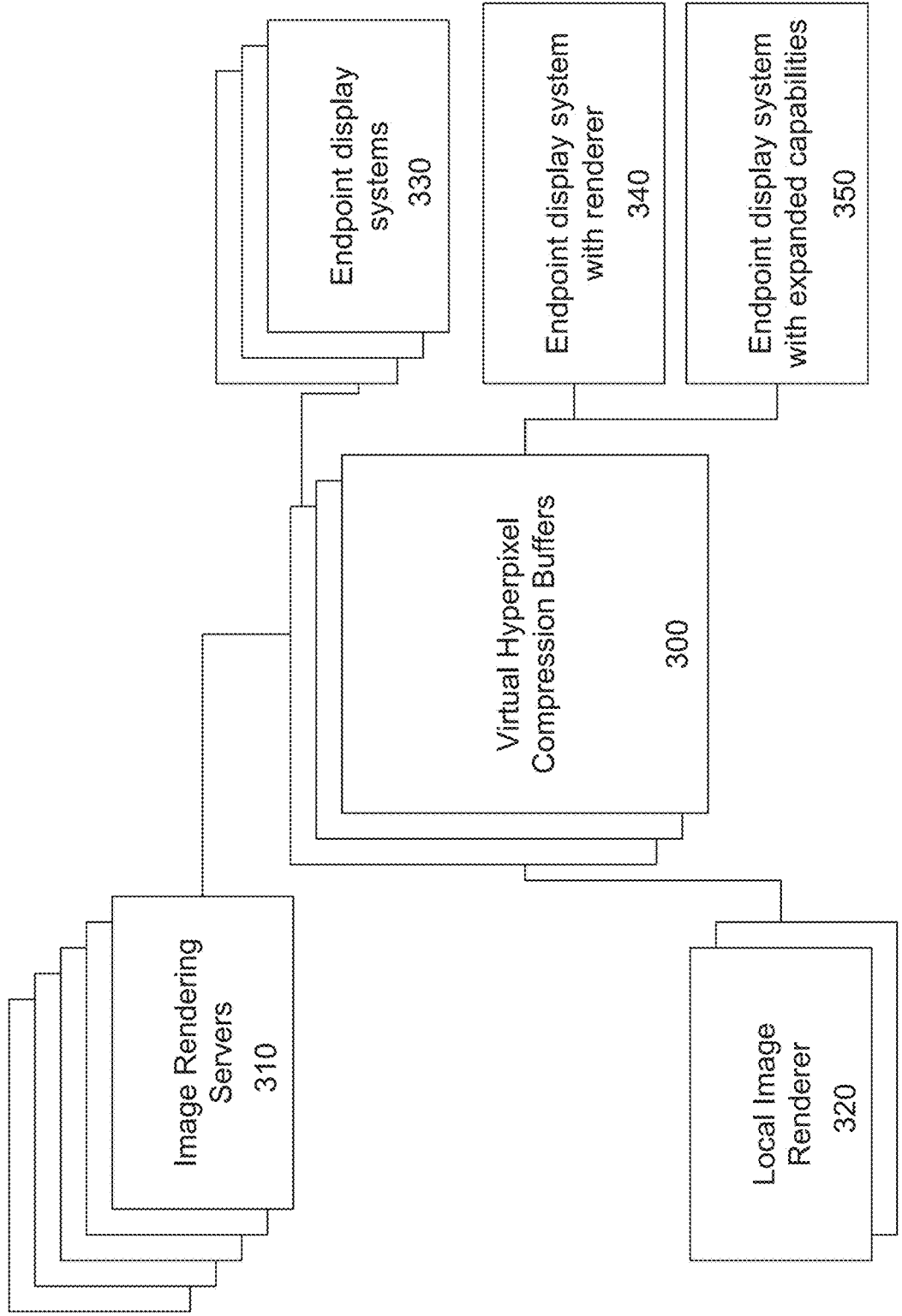
FIG. 3 shows a block diagram illustrating the components of a highly distributed real-time compression system in accordance with an embodiment of the present invention.

FIG. 3 represents a general block diagram of the major components in this typical preferred embodiment, showing the virtual connectivity of all the components and the shared nature of the compression buffers:

1. 300 shows one or more s VCHB's defining one or more most compressed shared states accessed by multiple devices. In practice, all devices could share a single physical memory buffer, each device could have coordinated instantiations of a buffer, or combinations thereof could be implemented. These buffers can be different for different combinational uses of the primary set of image data, possibly creating and maintaining multiple images, supersets or subsets, and thus allows them to be related and exploit mutual similarity and obtain optimization benefits. Specific instantiations of the VCHB may include accelerated logic for hyperpixel operations, such as combinatorial functions for example. As with any topology, specific implementation may depend on the technology used for communication, the memory types employed, the distances involved in the application, and so forth, but this preferred embodiment does not limit these implementations. It is assumed encryption and other information protection mechanisms are an optional part of this preferred embodiment of the VCHB or its instantiations. Those skilled in the art would readily understand these issues, tradeoffs, and optimizations.
2. 310 shows one or more networked servers that concentrate on image rendering, or such tasks as large database or computational processing coupled with image rendering or a service to overall compressed optimization (an example would be scene analysis).
3. 320 shows one or more near or local devices that concentrate on image rendering. In general, it would be expected this device bears the primary load for a larger portion of the image in order to minimize network traffic, but that is not necessarily the case. There may be applications where the resources available in a network server are needed, and that is one of the purposes of the invention.

4. 330 shows one or more edge devices that are primarily destinations for imagery, intended to display compressed images.
5. 340 shows one or more edge devices that are primarily destinations for imagery, but may have local capabilities to augment those images and hence are optimized for the appropriate portion of their image contribution and sharing of the VHCB or the instantiation of the VHCB.
6. 350 shows one or more edge devices that are primarily destinations for imagery but may have highly capable local hardware or software functions to augment those images and hence are optimized for the appropriate portion of their image contribution and sharing of the VHCB or the instantiation of the VHCB. They are also very likely to be key contributors to the VHCB, supplying data which may be used by the other elements such as the remote renderers.

Figure 4:
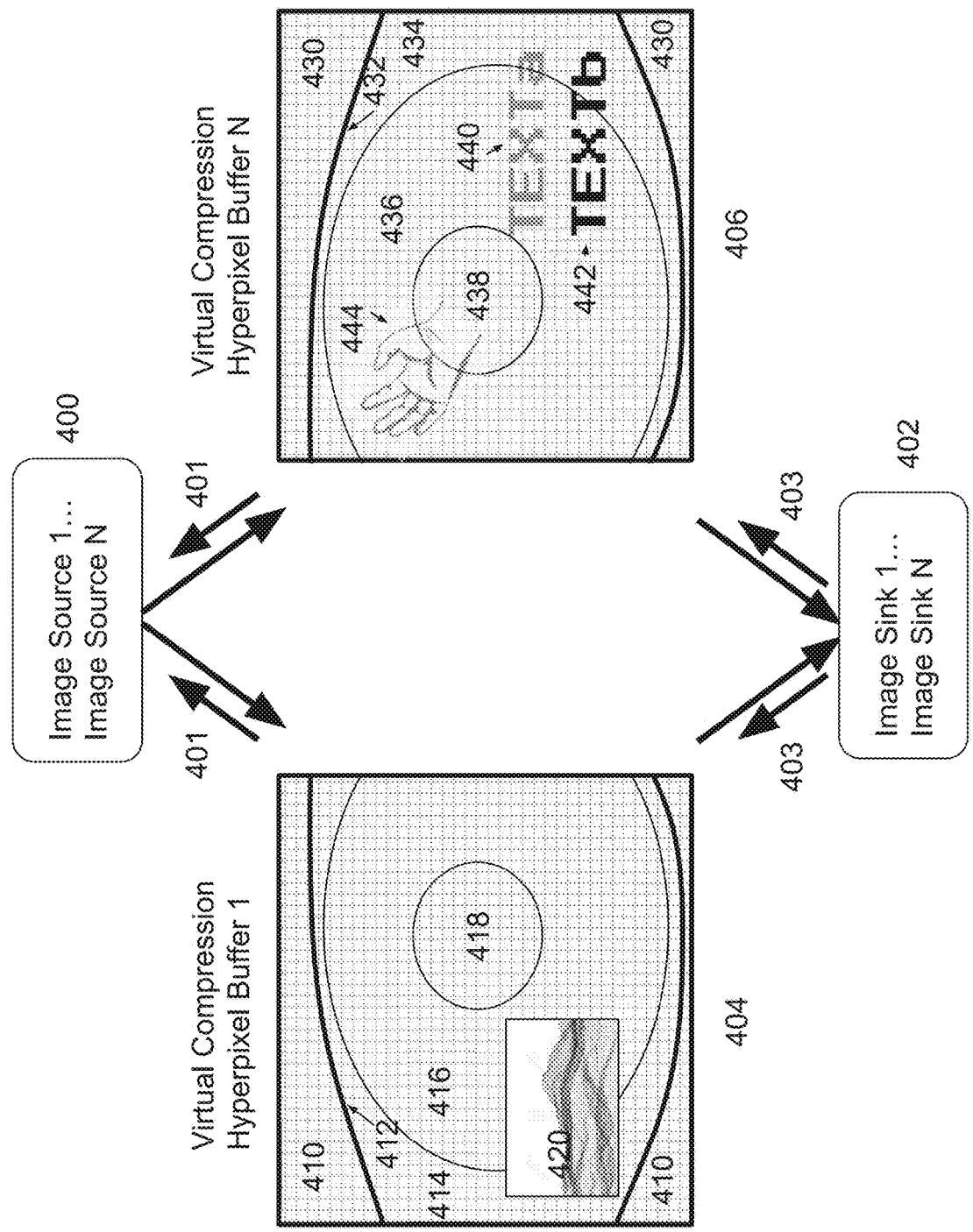
FIG. 4 shows a diagram illustrating example use of a highly distributed compression buffer system in accordance with an embodiment of the present invention, emphasizing the hyperpixel buffer inputs, construction and outputs.

FIG. 4 is an illustration representing primarily a two-dimensional view of the many types of regions considered in the creation of a stereoscopic (double image) view of the VHCB data for this preferred embodiment. It is not intended to limit the implementation to two buffers nor limit their component elements and use, but rather demonstrate some of the possible uses for a VR or AR application. Note there are deliberate similarities and also differences in each of the pair images represented in this Figure.

The hyperpixel buffer may include various bit depth and sub data at each virtual pixel. The buffer may represent coordinated metadata that is used during setup or changed dynamically during use. It may represent data at a higher resolution or lower resolution than a system component source or sink device. There can be overlapping regions, which would allow data in some circumstances to be consumed optimally, for example, to produce blended or anti-aliased portions of the image, or used to favorably combine images using overlapping or composited image and depth buffers, for instance. There will be as many regions as necessary to optimize representation and minimize data transmission in a coordinated fashion.

1. 400 represents one or more sources of image data, showing these sources may arbitrarily and in combination contribute to portions of the buffer or buffers.
2. 401 represents clear indication an image source can also be an image destination (or sink). Note that in the system any device can be a source or endpoint (sink), or serve both functions, but for convenience the figure shows a predominant flow from top to bottom.
3. 402 represents similarly one or more sinks for image data. Note there is no limitation that the number of sinks or consumers of information must be at a one to one ratio with sources or vice versa.
4. 403 represents clear indication an image destination or sink can also be an image source. Note that in the system any device can be a source or endpoint (sink), or serve both functions, but for convenience the figure shows a predominant flow from top to bottom.
5. 404 represents one or more compression buffers, in this case corresponding to a left viewpoint collection of data. Note this data is not limited in data type, resolution, or other attributes that are purely visual in nature or correspond to an eventual display device characteristics. This means, for example, the resolution could be a superset of final resolution or data components or a subset.
6. 406 represents similarly to 404 a right image of a stereoscopic view and may include different information types or data.
7. 410 represents a null zone of data in the image, usually represented in current practice instead with black pixels. The intent of this preferred embodiment is to allow the compression buffer to serve as an instantaneous transmission, meaning even run length encoded versions of this region would not have to be transmitted to the display endpoint device for example. The pixels would thus be filled in by the endpoint compression buffer.
8. 412 represents a delineation edge. This might conform to user-specific attributes such as glasses border, blind spots in the retina, nose impingements, or even eyebrow partial interference which might require blended rendering treatment. There is no implied limitation regarding pixel width.
9. 414 represents an example sub-region. In this preferred embodiment example it indicates a highly peripheral zone for foveal purposes. This may be represented with a much reduced bit depth representation but higher acuity than the transitional area as an example to optimize ergonomics. For instance, the palette may be indexed only to show high contrast choices with blue dominant colors.
10. 416 represents a transitional fovea zone. In this preferred embodiment example, this shows a foveal peripheral region. This may be represented with radially and spatially different bit depths, reducing resolution and red-based (a fovea focus color) palette colors the further from the focal point of the image.
11. 418 represents a foveal acuity zone. This area would be represented with the highest spatial fidelity but may include a different emphasis for the palette to optimize compression, such as reduced use of blue and increased range for red, while decreasing luminance contrast requirements.
12. 420 represents an insert augmentation zone. This could be used for an overlay or blend generated from an external source, such as advertising, or a separate image rendering. It could be used with unique bit depth (palette and depth buffer, for example) or a different resolution.
13. 430 is analogous to 410.
14. 432 is analogous to 412.
15. 434 is analogous to 414.
16. 436 is analogous to 416.
17. 438 is analogous to 418.
18. 440 represents a locally generated text overlay example. This could be used for a masked priority overlay on the end display device and shared or not shared with other elements.
19. 442 represents a locally generated text overlay example. This could be used for an overlay or color blended overlay purpose on the end display device with custom anti-aliasing treatment and shared or not shared with other elements.
20. 444 represents a locally generated interactive image component overlay example, such as display of a gesture recognition subsystem. This could be used for an overlay or combined via color and depth blended overlay on the end display device and shared or not shared with other elements.

Figure 5:
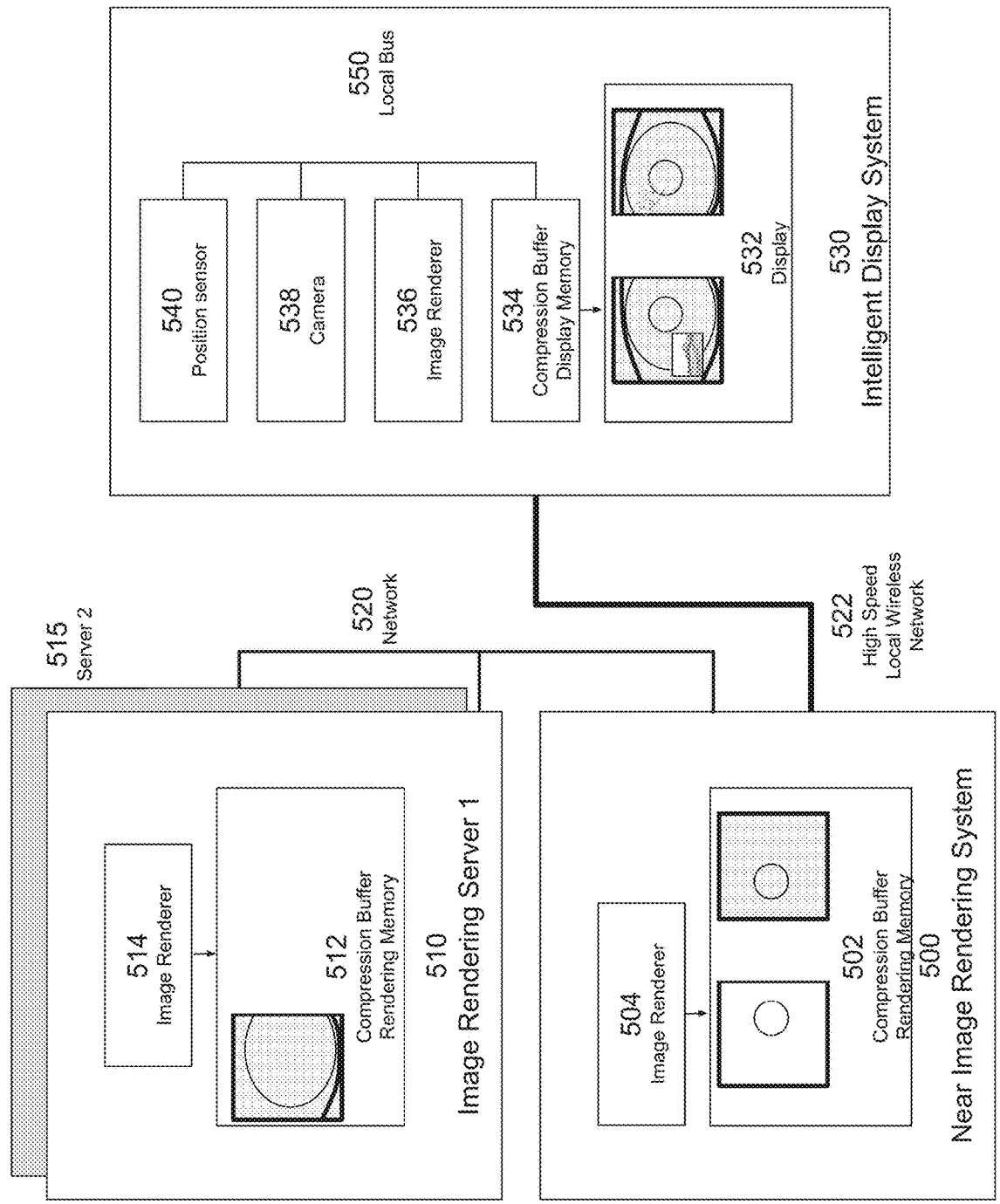
FIG. 5 shows a diagram illustrating example use of a distributed compression buffer system in accordance with an embodiment of the present invention, emphasizing components and topology of a hardware implementation.

FIG. 5 represents a more detailed description of the components of this preferred embodiment of the system, with a similar but expanded view of some elements of FIG. 3. It is intended to show some of the more nuanced design decisions of implementations, indicating also where flexibility is possible with the invention and is closer to representing a hardware implementation view of the system without limiting the system to such a design.

1. 500 represents one or more local or near systems that are rendering systems. This could be considered in current terminology as located at the near "edge" of the local network, rather than in the "cloud", where remote rendering servers may be located.
2. 502 represents the near device view or local instantiation(s) of the VHCB and includes an intentional demonstration of only one portion of the image being rendered for each of a stereo pair. This is not a limitation but shows the case where the near rendering device is tasked with inner foveal rendering at the highest resolution, for instance.
3. 504 represents the near renderer. It is not limited to a single device. It may or may not share databases with other components of the networked system, and similarly, it may only render certain attributes or portions of the image.
4. 510 represents one or more network resources. They are intended to represent server class resources with higher capability for contributions to the compression buffer contents, such as massive rendering power or specialized computational power.
5. 512 represents the contributions of one or more servers to a portion of the VHCB. Note in the example a peripheral fovea rendering for one eye is contributed by the topmost server. Other servers could perform any or all of the image creation or contribution portions. For example, one or more servers could supply a constant stream of time-warp component 'background" images, or perform portions of the convolutions necessary to employ them and contribute this, or even contribute a portion of the associated convolution function in a container for use in the VHCB. None of these examples are limitations to the system.
6. 514 represents the server image renderer. It could also be used to represent database functionality or computational capability or multiple internal units, without limitation.
7. 515 represents one or more instantiations of 510.
8. 520 represents a common network shared by many resources using the VHCB. It may be a single network, a series of point-to-point networks, or arbitrary topology combining those elements. Alternatively, wider network 520 could be connected directed to or in addition to or separately to display system 530, its components, or combinations thereof
9. 522 represents a point to point network intended for dedicated fast display of the VHCB. It is not intended as a limiting element, but rather to show this preferred embodiment implemented using a high-speed radio frequency network. Given suitable performance characteristics, the general network could also be used, or alternate network technologies such optical methods or others could be substituted. This also serves the purpose of highlighting how the VHCB topology can be a combination of shared and point-to-point components.
10. 530 represents one or more endpoint display systems. It is not a limiting interpretation, as an endpoint can also be a source for portions of the VHCB.
11. 532 represents one or more displays. In the example, this is ultimately a stereo display, but this is not a limitation.
12. 534 represents the compression buffer memory, which is closely coupled to the endpoint device display. It likely clocks out at a high and continuous frequency to the display, as do similar image buffers. Note the endpoint display image representation example includes custom and composite elements not present in other source buffer contributions. This is not a limitation.
13. 536 represents one or more renderers on the endpoint device. It is not a limitation, but in common practice, the device renderer has more limited capability than the near renderer or a server renderer.
14. 538 represents one or more camera image systems associated with the endpoint device. It is intended to demonstrate the endpoint can be a source of imagery or data that contributes either locally (at the endpoint) or globally (to the overall system) in some fashion. For example, Two local cameras could be used for stereo scene capture that are both a part of the same unit as the local display but contribute to a portion of the compression buffer that is used both locally and globally. Another set of cameras could be part of the eye tracking system with similar use, another set of cameras could process facial or gesture recognition, and others could be used for such endpoint or shared purposes as infrared-specific imaging. These are examples and not limitations.
15. 540 represents one or more edge device positional sensors. The traditional use of this function is to provide six degrees of freedom (6DOF) information, indicating yaw, pitch, roll, and x, y and z spatial coordinates, at high accuracy and update rates. This is not a limitation but an example, and as with all the other elements can be used in combination at the endpoint or provided to the distributed components using the VHCB.

While the present invention has been described in terms of particular embodiments and applications, in both summarized and detailed forms, it is not intended that these descriptions in any way limit its scope to any such embodiments and applications, and it will be understood that many substitutions, changes, and variations in the described embodiments, applications and details of the method and system illustrated herein and of their operation can be made by those skilled in the art without departing from the spirit of this invention.

Having thus described my invention, what I claim as new and desire to secure by Letters Patent is as follows:

1. A low latency image stream compression system, comprising:

A virtual compression hyperpixel buffer (VCHB), implemented in one or more physical buffers in a distributed system, said VCHB mapping to regions in a spatial world, said VCHB enabling per-pixel variable bit compression of said image stream;

two or more devices coordinated by said VCHB in a transmission system such that said image stream is comprised of preset data stored in said VHCB and real-time data transmitted via said VCHB, wherein said image stream is comprised of images representing projections of said regions from said spatial world, and wherein latency is reduced by applying said per-pixel variable bit compression to reduce bits used to represent selected portions of said projections.

2. A low latency image stream compression system as in claim 1, wherein latency is reduced by reducing said real time data in relation to said preset data.

3. A low latency image stream compression system as in claim 2, wherein latency is reduced by applying said per-pixel variable bit compression to reduce said real-time data.

4. A low latency image stream compression system as in claim 1, wherein said projection forms a two-dimensional view.

5. A low latency image stream compression system as in claim 1, wherein said projection includes metadata.

6. A low latency image stream compression system as in claim 1, wherein said preset data changes dynamically.

7. A low latency image stream compression system as in claim 1, wherein the VCHB includes non-visual image-context information.

8. A low latency image stream compression system as in claim 7, wherein the VCHB includes device characteristics which aid a system element contributing to efficient compression and transmission.

9. A low latency image stream compression system as in claim 1, further comprising a display device using images from one or more image streams to present a stereoscopic view.

10. A low latency image stream compression system as in claim 9, wherein one or more images contains multispectral sensor data.

11. A method for low latency image stream compression, comprising:
    using a virtual compression hyperpixel buffer (VCHB), implemented in one or more physical buffers in a distributed system, to map regions in a spatial world, said VCHB enabling per-pixel variable bit compression of said image stream;
    coordinating two or more devices by said VCHB in a transmission system such that said image stream is comprised of preset data stored in said VCHB and real-time data transmitted via said VCHB,
    wherein said image stream is comprised of images representing projections of said regions from said spatial world, and
    wherein latency is reduced by applying said per-pixel variable bit compression to reduce bits used to represent selected portions of said projections.

12. A method for low latency compression of an image stream as in claim 11, wherein latency is reduced by reducing said real time data in relation to said preset data.

13. A method for low latency compression of an image stream as in claim 12, wherein latency is reduced by applying said per-pixel variable bit compression to reduce said real-time data.

14. A method for low latency compression of an image stream as in claim 11, wherein said projection forms a two-dimensional view.

15. A method for low latency compression of an image stream as in claim 11, wherein said projection includes metadata.

16. A method for low latency compression of an image stream as in claim 11, wherein said present data changes dynamically.

17. A method for low latency compression of an image stream as in claim 11, wherein the VCHB includes non-visual image-context information.

18. A method for low latency compression of an image stream as in claim 17, wherein the VCHB includes device characteristics which aid a system element contributing to efficient compression and transmission.

19. A method for low latency compression of an image stream as in claim 11, further comprising a display device using images from one or more image streams to present a stereoscopic view.

20. A method for low latency compression of an image stream as in claim 19, wherein one or more images contains multispectral sensor data.

21. A system for low latency transmission of an image stream, comprising:
    A virtual compression hyperpixel buffer (VCHB), implemented in one or more physical buffers in a distributed system, said VCHB enabling per-pixel variable bit compression of said image stream; and
    a plurality of devices coordinated by said VCHB in a transmission system such that said devices use preset data stored in said VCHB to agree upon a data representation of each pixel in a transmitted image, said data representation being able to vary on a pixel-by-pixel basis,
    wherein reduced transmission latency emerges from compression optimizing coordinated by said VCHB.

22. A system for low latency transmission of an image stream as in claim 21, wherein some of said preset data is updated dynamically.

23. A system for low latency transmission of an image stream as in claim 21, wherein said image stream is human-visual range imagery.

24. A system for low latency transmission of an image stream as in claim 21, wherein said image stream includes multispectral sensor data or metadata.

25. A system for low latency transmission of an image stream as in claim 21, wherein said VCHB includes non-visual but image-context information.

26. A system for low latency transmission of an image stream as in claim 21, wherein said per-pixel variable bit compression via said VCHB obviates negative firewall effects of pipelined image compression.

27. A system for low latency transmission of an image stream as in claim 21, wherein said coordination enables optimization of image processing of a region within an image.

28. A system for low latency transmission of an image stream as in claim 27, wherein said optimization consists in spreading a workload of said image processing over more than one of said plurality of devices.

29. A system for low latency transmission of an image stream as in claim 28, wherein said plurality of devices includes a near renderer and the work of the near renderer coordinated by the VCHB optimizes image processing of a sub-region of said region.

30. A system for low latency transmission of an image stream as in claim 29, wherein said sub-region is a peripheral fovea zone optimized by a data representation of pixels in the sub-region having reduced bit depth but higher acuity than pixels in a transitional fovea sub-region.

31. A system for low latency transmission of an image stream as in claim 29, wherein said sub-region is a transitional fovea zone optimized by a data representation of pixels in the subregion having radially and spatially different bit depths and red-based palette colors the further from a focal point of the image.

32. A system for low latency transmission of an image stream as in claim 21, wherein latency is reduced by reducing a number of bits in said data representation, said reductions being optimized for an image on a per-pixel basis.

33. A system for low latency transmission of an image stream as in claim 21, wherein a composited image at a local display includes a locally generated overlay.

34. A system for low latency transmission of an image stream as in claim 33, wherein the locally generated overlay is shared via the VCHB.

35. A system for low latency transmission of an image stream as in claim 21, wherein a region of an image is composited from sub-regions rendered by different devices and from an insert augmentation zone used as an overlay.

36. A system for low latency transmission of an image stream as in claim 35, wherein said overlay is generated by a separate image renderer.

37. A system for low latency transmission of an image stream as in claim 36, wherein said overlay is locally generated text with custom anti-aliasing treatment.

38. A system for low latency transmission of an image stream as in claim 36, wherein said overlay is a locally generated interactive image component and is not shared via said VCHB.

39. A system for low latency transmission of an image stream as in claim 35, wherein said overlay generated locally on a display device and is used as a masked priority overlay on the local display device.

40. A system for low latency transmission of an image stream as in claim 39, wherein said masked priority overlay is shared via said VCHB.

\* \* \* \* \*